United States Patent
Samiran et al.

[11] 3,888,598
[45] June 10, 1975

[54] MULTIPLE COIL WIRE LOCK ARRANGEMENT

[76] Inventors: David Samiran, 148 Northwest Rd.; Arthur H. Moore, 46 Northwest Rd., both of Westfield, Mass. 01085

[22] Filed: Dec. 11, 1973

[21] Appl. No.: 423,737

[52] U.S. Cl............................. 403/372; 192/41
[51] Int. Cl............................. F16d 1/06
[58] Field of Search ....... 85/32 CS; 279/2; 403/372; 242/72; 192/41 S

[56] References Cited
UNITED STATES PATENTS

| | | | |
|---|---|---|---|
| 1,686,455 | 10/1928 | Lieber | 192/41 S |
| 2,818,264 | 12/1957 | Overstreet | 279/2 |
| 2,991,954 | 7/1961 | Lacey | 242/72 |
| 3,127,186 | 3/1964 | Van Reussen | 279/2 |

FOREIGN PATENTS OR APPLICATIONS

| | | | |
|---|---|---|---|
| 197,178 | 0000 | United Kingdom | 192/41 S |

OTHER PUBLICATIONS

Article in American Machinist, Oct. 11, 1945, pg. 131, called "Loose Thread Mandrel Holds Tubular Work on Center."

*Primary Examiner*—Andrew V. Kundrat
*Attorney, Agent, or Firm*—Albert L. Jeffers; Roger M. Rickert

[57] ABSTRACT

An arrangement for centering members such as wheels, cranks, sheaves, gears and the like on shafts while simultaneously locking the members to the shafts in which a multiple turn wire coil is mounted on the shaft and is expanded radially by engagement with the opposite ends of the wire coil to cause the wire coil grippingly to engage the inside of the member mounted on the shaft.

6 Claims, 5 Drawing Figures

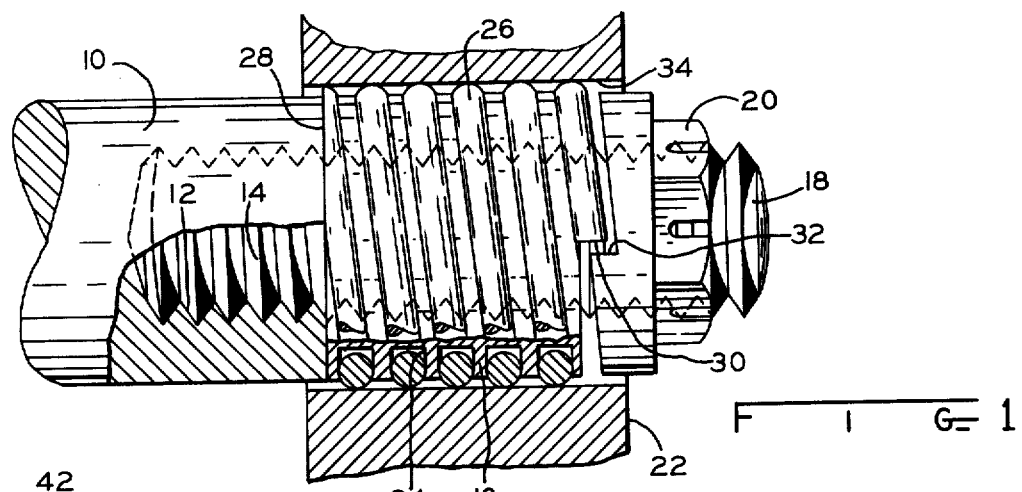
FIG. 1
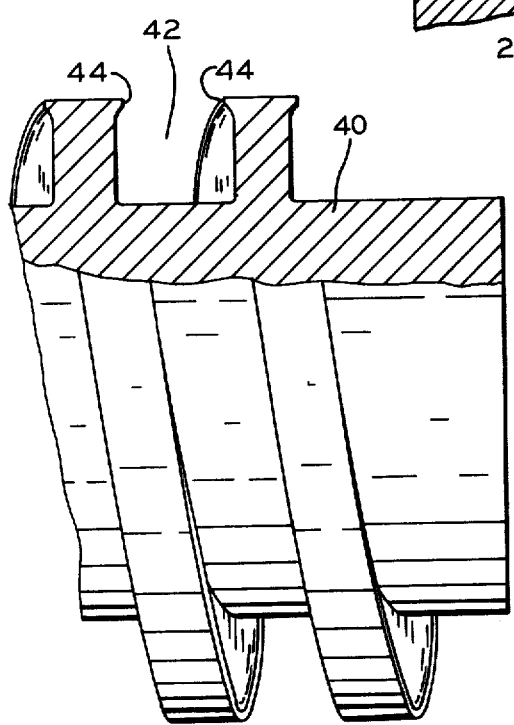
FIG. 2
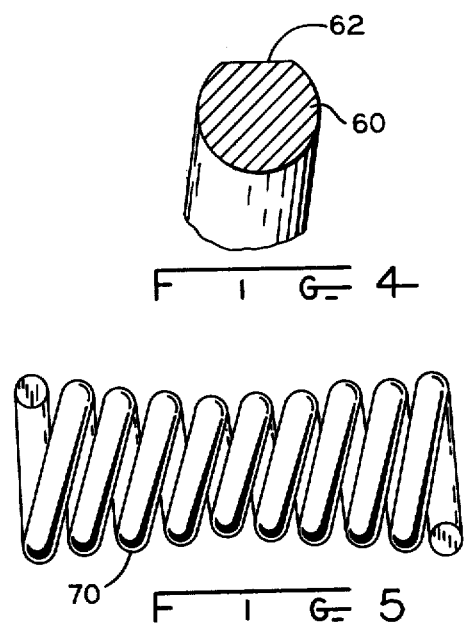
FIG. 4
FIG. 5
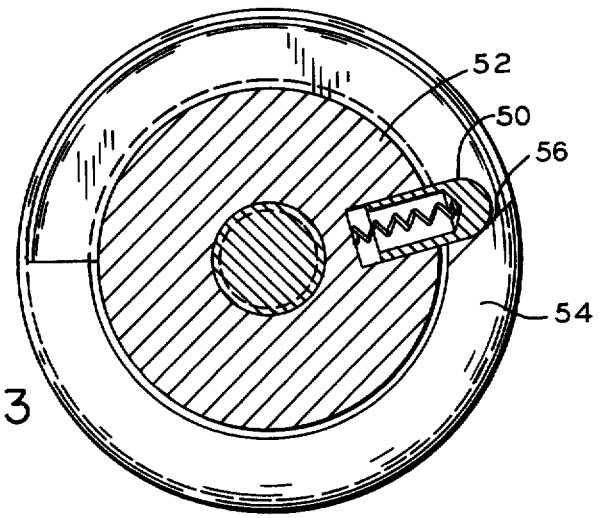
FIG. 3

MULTIPLE COIL WIRE LOCK ARRANGEMENT

The present invention relates to an arrangement for connecting members to shafts to be driven thereby and is particularly concerned with connecting members to shafts so that the members are nonaxially movable on the shafts while the members can be rotated by the shafts.

It is usually the case that a key is employed for connecting a driven member to a shaft which effects the driving of the member. Such keys are ordinarily in the form of bar-like elements that are received in recesses, or keyways, which are formed partly in the shaft and partly in the member to be connected thereto. When extremely heavy torques are to be exerted on the shaft, more than one key of the nature described is often employed.

The present invention is concerned with an arrangement for connecting members to shafts in such a manner that the use of keys and keyways is eliminated while the connecting of the member to the shaft is extremely secure.

A primary object of the present invention is the provision of an arrangement which can easily be assembled with a shaft and a member to be connected thereto and which will center the member on the shaft and, at the same time, key the member to the shaft so that driving torque can be transmitted between the member and the shaft.

Another object of the present invention is the provision of an arrangement of the nature referred to which is adapted for substantially any size shaft.

Still another object of the present invention is the provision of an arrangement of the nature referred to in which the individual components of the arrangement are relatively inexpensive and are simple to apply.

The aforementioned objects as well as other objects and advantages of the present invention will become more apparent upon reference to the following detailed specification taken in connection with the accompanying drawings in which:

FIG. 1 is a fragmentary view showing a member secured to a shaft by a device according to the present invention.

FIG. 2 is a fragmentary view of a component of a device showing one manner in which the device can be formed.

FIG. 3 is a sectional view through a modified form which the device can take.

FIG. 4 is a sectional view through a convolution of the wire forming the component of the device showing how the wire can be flattened toward the outside.

FIG. 5 is a view showing a modified form which the wire of the device can take.

BRIEF SUMMARY OF THE INVENTION

According to the present invention a secure connection is made between a member and a shaft on which it is mounted by interposing between the member and the shaft a multiple turn wire coil or spring coaxial with the shaft and supported on a suitable support member having a helical slot therein or supported in a helical slot formed in the shaft. The opposite ends of the multiple turn coil are abutted and the wire coil is, in this manner, caused to expand radially into tight gripping relation with the member on the shaft. The member is thus centered on the shaft while the member simultaneously is held on the shaft against the axial movement thereon and while the spring will transmit torque between the member and the shaft.

DETAILED DESCRIPTION OF THE INVENTION

Referring to FIG. 1, numeral 10 designates a shaft having a threaded hole 12 in the end and into which is threaded a screw 14. Screw 14 extends through a central hole in a support member 16 and projects outwardly beyond the end of the support member as at 18 for receiving a special abutment member 20 which is internally threaded for engaging the shaft 18.

Coaxially surrounding shaft 10 is a member 22 which may be a gear or a pulley or a sheave or a crank or the like and which is to be fixedly clamped to the shaft in a centered location thereon.

Member 16 is formed with a helical groove 24 therein in which is seated a helical spring 26. The end of helical spring 26 adjacent the end of shaft 10 is flattened so as to be perpendicular to the axis of the shaft as indicated at 28 and bears directly on the end of the shaft.

The other end of the helical coil 26 is cut off as at 30 and is at that point engaged by circumferentially facing shoulder 32 on abutment member 20 when the abutment member is turned up tight on screw 18. When shoulder 32 on abutment member 20 engages end 30 of the wire coil, the wire coil will be expanded radially into tight gripping relationship with the radially inwardly facing surface 34 of the hole in member 22. Abutment member 20 can be locked in place as by a clamp nut or by a cotter pin or in any other desired manner. Similarly, member 16 can be fixed against rotation in a suitable manner if so desired.

Member 16 can be formed as an integral part of shaft 10, if so desired, or it may have threaded extensions on opposite ends rather than fitting over screw 14. When the device is constructed as illustrated in FIG. 1 it is preferable internally to thread member 16 so that when it is drawn up tight against the end of shaft 10 it is held thereon against rotation.

As will be seen in FIG. 2, a coil wire support member 40 can be constructed in which the helical groove 42 formed therein for receiving a wire is provided with inwardly projecting shoulders 44 at the opposite sides which maintain the wire captive in the groove and in a state of partial compression.

In FIG. 1, the coil spring had a flat end engaging the end of shaft 10 but this end of the spring could be abutted by a spring plunger as shown at 50 in FIG. 3. Plunger 50 is mounted in a bore in member 52 which has the helical groove formed therein for receiving the coil spring 54 and is spring urged radially outwardly so as to engage the inclined end surface 56 of the coil and thereby provide a stop for the coil while simultaneously biasing the coil in expanding direction.

As will be seen in FIG. 4, a wire coil 60 which may consist of several convolutions may have the radially outer side thereof flattened as at 62 thereby to increase the area which grips the member which surrounds the coil spring.

FIG. 5 shows a manner in which a coil spring 70 can be formed so as to have enlarged end parts for somewhat better gripping especially in the end regions of the spring.

It will be apparent that all of the parts making up the device according to the present invention can easily be fabricated at small expense and that the device is highly flexible and can be used in substantially any circumstance in which a member is to be connected to a shaft.

The shaft can be either larger or smaller in diameter than the connecting device and the member to be mounted on the shaft need not have a hole therein formed in close conformity to the region of the shaft on which it is to be mounted.

Modifications may be made within the scope of the appended claims.

What is claimed is:

1. In combination; a shaft and a member to be fixed to the shaft and having a hole therein coaxial with the shaft, a multiple convolution helical wire coil disposed in the hole coaxial with said shaft and having ends, support means for said coil, said support means having a helical groove for receiving the inner side of said coil, abutment means nonrotatably connected to said shaft and engaging opposite ends of said coil, at least one of said abutment means being adjustable circumferentially of said shaft for expanding said coil into gripping relation with the hole to lock the member to said shaft so that the shaft and member can be rotated in either direction, and said support means comprises a cylindrical member coaxial with said shaft and fixed to one end of said shaft and having said helical groove formed in the outer surface thereof.

2. The combination according to claim 1 in which said one abutment means comprises a nut having threaded connection with said shaft and including a circumferentially facing shoulder opposed to the adjacent end of said coil.

3. The combination according to claim 1 in which said support member is about the same diameter as said shaft, the end of said coil nearest the shaft being flattened so as to be in a plane substantially perpendicular to the axis of said shaft and engaging the adjacent end of the shaft.

4. The combination according to claim 1 in which said wire coil is formed by spring steel with at least the sides of each convolution rounded and said helical groove slightly more narrow at the radially outer open side than the maximum distance between the rounded sides of the convolutions of the coil.

5. The combination according to claim 1 in which said wire coil has convolutions at the end regions which are larger in diameter than the convolutions of the coil in the intermediate region.

6. The combination according to claim 1 in which said cylindrical member has a threaded axial bore, and a stud threaded into said shaft and on which said cylindrical member is threaded, said stud protrudes from the end of said cylindrical member opposite the shaft for receiving said one abutment means.

* * * * *